March 26, 1929.      R. S. BLAIR      1,707,109
FLUID TEMPERATURE CONTROL
Filed July 2, 1927
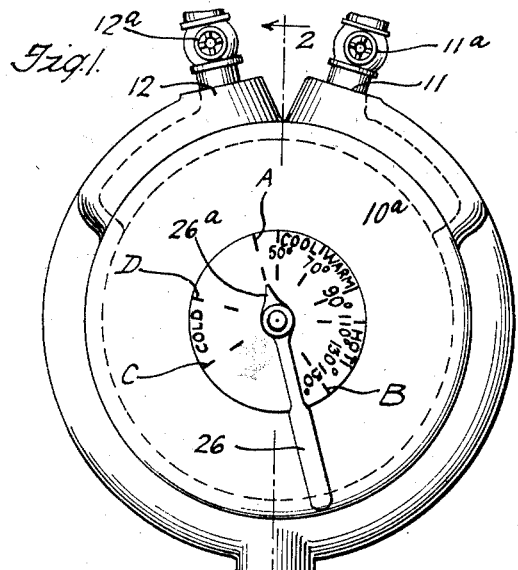
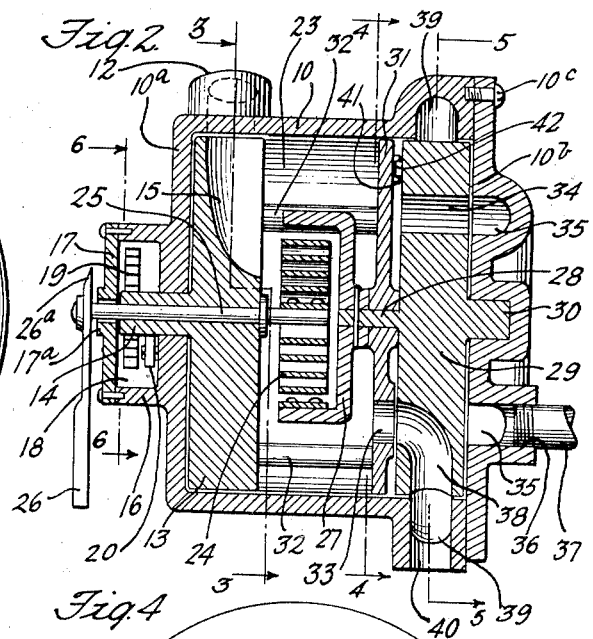
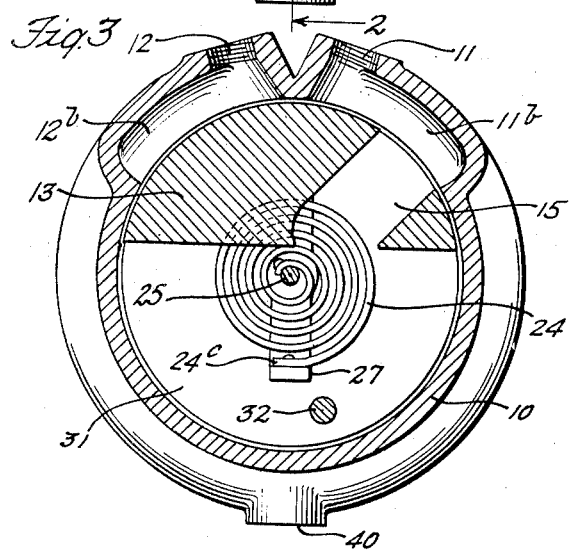
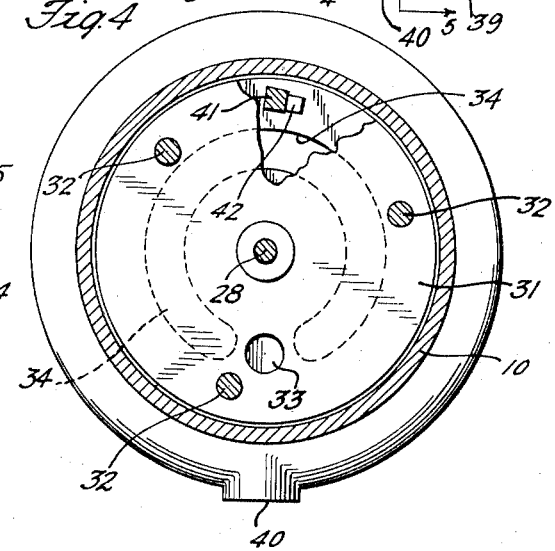
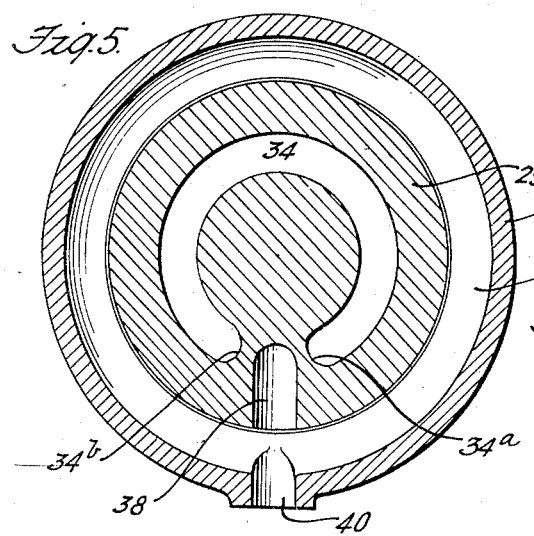
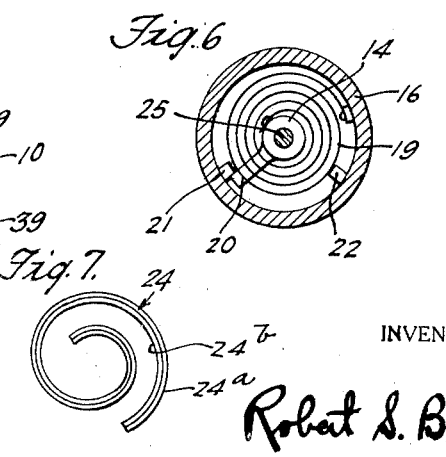
INVENTOR
Robert S. Blair Patented Mar. 26, 1929.

1,707,109

UNITED STATES PATENT OFFICE.

ROBERT S. BLAIR, OF STAMFORD, CONNECTICUT.

FLUID TEMPERATURE CONTROL.

Application filed July 2, 1927. Serial No. 203,228.

This invention relates to fluid temperature control and apparatus for accomplishing such control.

One of the objects of the invention is to provide apparatus of the above nature of highly efficient action, capable of meeting the requirements of practical use in a highly satisfactory manner. Another object is to provide apparatus of the above nature whereby a volume of water or other fluid at a desired predetermined temperature may dependably be obtained from a hot and cold supply. Another object is to provide apparatus of the above nature simple in construction and conveniently operated and adjusted. Other objects will be in part obvious or in part pointed out hereinafter.

The invention accordingly consists in the features of construction, combinations of elements, and arrangements of parts, all as will be illustratively described herein, and the scope of the application of which will be indicated in the following claims.

In the accompanying drawing, in which is shown one of the various possible embodiments of the mechanical features of this invention, Figure 1 is a front elevation of the apparatus;

Figure 2 is a section taken substantially along the line 2—2 of Fig. 1;

Figures 3, 4, 5 and 6 are sections taken respectively along the lines 3—3, 4—4, 5—5 and 6—6 of Fig. 2, and Figure 7 is a detail view of one of the parts of the apparatus.

Similar reference characters refer to similar parts throughout the several views of the drawing.

Referring now to the drawing in detail, there is shown a casing 10 substantially cylindrical in form, and provided adjacent its forward end with a pair of inlet openings or passages 11 and 12. These passages are adapted respectively for the admission of a hot fluid and a cold fluid to the interior of the casing, the passage 11 being in this instance adapted for the admission of hot water and the passage 12 being adapted for the admission of cold water. The flow of water to the two passages may be manually controlled, for example, by means of the two valves 11$^a$ and 12$^a$. The passages 11 and 12, as shown in Figure 3, open at their inner ends into elongated recesses 11$^b$ and 12$^b$. Within the casing 10 and close against the forward wall 10$^a$ thereof is a valve disk 13. This valve disk is rotatably mounted within the casing, being provided with a hub 14 projecting through and rotatably supported in the wall 10$^a$. The periphery of the rotatable valve disk 13 registers with the two recesses 11$^b$ and 12$^b$ and in its rear face the disk is provided with a substantially radial recess or groove 15 through which the passages 11 and 12, by way of the recesses 11$^b$ and 12$^b$, are adapted to communicate with the interior of the casing. By rotation of the disk 13 in one direction or in the other, the recess 15 may register with the inlet passage 11 or with the inlet passage 12 or may take an intermediate position registering with both passages. The recesses 11$^b$ and 12$^b$ respectively forming the inner ends of the passages 11 and 12 are each of greater length than the width of the groove or recess 15, as shown in Figure 3, for a purpose which will be pointed out hereinafter.

On the outer face of the wall 10$^a$ of the casing is a circular flange 16 against which is removably secured a cover plate 17 forming therewith and with the face of the wall 10$^a$ a small chamber 18. Within this chamber is a spiral spring 19, one end of which is secured to the hub 14 of the rotatable valve disk 13, and the other end of which is secured to the stationary flange 16 (Fig. 6). This spring 19 urges the valve disk 13 to rotate in a clockwise direction, as viewed from the front of the apparatus. The hub 14 is provided with a radial arm 20 in the path of rotation of which are positioned two stops 21 and 22 on the inner side of the flange 16. The spring 19 normally holds the arm 20 against the stop 21, and in such position the recess 15 is in registry with the hot water inlet 11$^b$ alone, and at the extreme end thereof remote from the cold water inlet 12$^b$, the parts being shown in such position in the drawing. When the valve disk 13 is rotated in a counter-clockwise direction so that the arm 20 comes against the stop 22, the recess 15 is positioned in registry with the cold water inlet 12$^b$ alone, and at the extreme end thereof remote from the hot water inlet. At certain intermediate positions of the valve disk 13 the recess 15 will register in part with both intakes 11$^b$ and 12$^b$, and both hot and cold water will be admitted to be mixed in the chamber 23 at the rear of the valve disk 13.

Thus by controlling the position of the rotatable valve disk 13 hot water alone or cold water alone or any proportion of hot and cold water may be admitted to the mixing chamber 23. Within the chamber 23 is a thermostat 24. This thermostat preferably takes the form of a spiral coil, which expands as its temperature rises and contracts as its temperature falls. The coil may be formed, for example, from a strip, as shown in Figure 7, comprising two layers of metal $24^a$ and $24^b$ having unequal coefficients of expansion. The inner end of the thermostat coil is connected to a spindle 25 which passes loosely through the center of the valve disk 13 and its hub 14, and projects through the cover plate 17. On the front end of this spindle is a handle 26 by means of which the spindle may be manually rotated to rotate the thermostat coil, and thereby adjust the angular position of its outer end $24^c$. In the cover plate 17 about the spindle 25 is positioned a stuffing-box $17^a$ which in addition to forming a water tight joint between the spindle and the cover plate offers frictional resistance to the rotation of the spindle, holding the spindle in the position to which it is manually rotated and adjusted.

The outer end $24^c$ of the thermostat coil 24 is secured to one arm of a U-shaped member 27. This member 27 is rigidly connected by a spindle 28 with a second valve disk 29, the connecting spindle 28 being coaxial with the spindle 25. The valve disk 29 is rotatably supported within the casing 10 by a hub 30 which is also coaxial with the spindle 25, and hence with the valve disk 13, and which is rotatably mounted in the removable rear cover plate $10^b$ of the casing. The rear cover plate $10^b$ is removably held in place as by screws $10^c$.

The spindle 25, as has been described, passes loosely through the valve disk 13 so that it may be rotated by means of the handle 26, for rotation of the thermostat 24, without affecting the position of the valve disk 13, except as will be later described. The outer end $24^c$ of the thermostat coil being connected through the member 27 and the spindle 28 with the valve disk 29, rotation of the handle 26, such rotation moving the outer end $24^c$ of the thermostat coil, correspondingly rotates the valve disk 29.

Loosely mounted upon the connecting spindle 28 is a plate 31 which substantially fits the interior of the casing 10 and closes the rear of the mixing chamber 23. This plate 31 is rigidly connected with the forward valve disk 13, as by the connecting arms 32, so that the plate 31 and the valve disk 13 will rotate together. Hence a rotation of the plate 31 will affect the position of the recess 15 in the valve disk 13 with respect to the intake passages $11^b$ and $12^b$.

The plate 31 is provided with a circular opening 33 therethrough. In the valve disk 29 are formed two passages which are respectively adapted, according to the relative positions of the two plates 29 and 31, to coact with the opening 33 for the removal of water from the mixing chamber 23. One of these passages in the valve disk 29 is the passage 34 which comprises a slot cut through the valve disk, and of the shape and extent shown in Figures 4 and 5, being substantially circular in form for registering with the opening 33 at any point along its length, and its two ends $34^a$ and $34^b$ approaching each other substantially as shown in these figures. On the inner surface of the rear cover plate $10^b$ is a continuous circular depression 35 which registers with the slot 34. This depression or recess 35 is connected at 36 with a pipe 37 leading to waste.

The passage 34 through the valve disk 29 is in continual registry with the passage 35. Thus, whenever the slot 34 is in registry with the opening 33 at any point along the length of the slot, the water from the mixing chamber 23 is discharged to waste.

The second passage through the valve disk 29 is adapted to coact with the opening 33 in the passage 38, which is circular in cross-section, and of substantially the size of the opening 33, and which opens through the periphery of the valve disk 29. In the inner surface of the casing 10, and registering with the peripheral opening of the passage 38, is formed a continuous depression or recess 39 which is provided at the bottom of the casing with a faucet opening 40, it being understood that the term faucet is broadly used to comprehend any suitable water-discharging means. The passage 38 in the valve disk 29 is thus always in communication with the faucet 40, and when the plate 31 and the valve disk 29 are in such relative positions that the opening 33 registers with the passage 38, the water from the chamber 23 is discharged through the faucet 40 for use. Thus, by controlling the relative positions of the plate 31 and the valve disk 29, the water flowing into the mixing chamber 23 may either be discharged through the faucet 40 or be diverted through the slot 34 to the waste pipe. In the position shown in the drawing, the parts are positioned for discharge of the water from the faucet 40.

Projecting from the face of the plate 31 toward the valve disk 29 is a lug 41. A lug 42 projecting from the face of the valve disk 29 is positioned thereon to engage the lug 41 when the valve disk 29 is rotated a certain amount in a counter-clockwise direction. When these two lugs are in engagement, which is the position occupied by the parts in the drawing, the opening 33 is in registry with the passage 38 and the mixing chamber 23 is connected to discharge through the faucet 40. In all other relative positions of the plate 31 and the valve disk 29, that is, when the stops 42 and 41 are not in engagement, the opening 33 communicates with the passage 34 in the valve disk 29 and the chamber 23 is opened to discharge to the waste pipe.

With the parts of the apparatus in the positions shown in the drawing, the arm 20 (Fig. 6) is in engagement with the stop 21 and the intake recess 15 of the valve disk 13 is therefore in its extreme hot water position, the spring 19 holding the valve disk 13 in such position. By rotation of the spindle 25 by means of the handle 26, the valve disk 29 carrying the lug 42 may be rotated, as has been described. Rotation of the valve 29 in a counter-clockwise direction from its position shown in the drawing, the lugs 41 and 42 being engaged, rotates the plate 31 in counter-clockwise direction and with it the valve disk 13, moving the intake recess 15 toward the cold water inlet against the action of the spring 19. This counter-clockwise rotation may be continued until the arm 20 comes against the stop 22 (Fig. 6) in which position the intake recess 15 of the valve disk 13 is in its extreme cold water position. If the movement of the valve disk 29 and hence of the valve disk 13 is stopped when the intake recess 15 is partly in registry with both inlet passages 11$^b$ and 12$^b$, a mixture of hot and cold water will be admitted to the mixing chamber 23. At all points along the path of movement of the intake recess 15 from its extreme hot water position to its extreme cold water position, the lugs 41 and 42 are in engagement, the valve disk 29 and the plate 31 being thereby so disposed that the opening 33 registers with the passage 38 and the water entering the chamber 23 is discharged through the faucet 40.

When the valve disk 29 is rotated in clockwise direction from its position shown in the drawing, the lug 42 moves away from the lug 41 and the positions of the plate 31 and valve disk 13 are not affected, the intake recess 15 being held in its extreme hot water position by the spring 19, and counter-clockwise rotation of the valve disk 13 being prevented by the arm 20 and the stop 21.

By rotation of the handle 26, therefore, the disk 29 may be rotated to move the disk 13 so as to position the intake recess 15 at its extreme cold water position or at any intermediate position therefrom to its extreme hot water position. The disk 13 being held in extreme hot water position by the arm 20 and stop 21, by rotation of the handle 26, the disk 29 may be rotated to position the lug 42 at any desired distance from the lug 41. This, as has been described, is accomplished by rotation of the disk 29 in a clockwise direction beyond its position shown in the drawing.

The outer end of the thermostat coil 24 is connected with the arm 27, which is in turn connected through the spindle 28 with the valve disk 29. The thermostat coil 24, as its temperature rises, tends to straighten out or expand, and such expansion effects a counter-clockwise movement of its free end 24$^c$, and hence a counter-clockwise movement of the valve disk 29. Thus, if the handle 26 is so adjusted that the lugs 41 and 42 are out of engagement, and if the temperature of the thermostat coil rises, the lug 42 will move toward the lug 41, and if the rise in temperature is of sufficient extent the lugs 42 and 41 will engage and the valve disk 13 will be turned toward cold water position. If the temperature of the thermostat coil 24 decreases, the thermostat will coil up or contract, and such contraction will effect a clockwise rotation of the free end 24$^c$, thereby effecting a clockwise rotation of the valve disk 29. Thus, if the valve disk 29 is so positioned that the lugs 41 and 42 are in engagement holding the valve disk 13, against the action of the spring 19, away from its extreme hot water position, a decrease in temperature of the thermostat coil will result in a movement of the valve disk 13 toward its hot water position.

As shown in Figure 1, the handle 26 is provided with a pointer 26$^a$, and the front of the casing is graduated as indicated. When the handle is moved so that the pointer 26$^a$ points to the line C, the valve disk 29 has been rotated in counter-clockwise direction to such extent that, through the lugs 41 and 42, the valve disk 13 has been rotated so that it is in its extreme cold water position. When the pointer 26$^a$ points toward the line A, which is the position of the parts shown in the drawing, the valve disk 13 is in its extreme hot water position, and the lugs 41 and 42 are just in engagement. Further adjustment of the handle 26 in a clockwise direction rotates the disk 29 to move the lug 42 away from the lug 41, the disk 31 remaining in full registry with hot water as shown. When the pointer 26$^a$ is adjusted to point to the right of the line A, therefore, the lug 42 is out of engagement with the lug 41. An increase in temperature of the thermostat 24 and consequent expansion thereof will now effect a movement of the lug 42 toward the lug 41, and if the expansion is of sufficient extent, the valve disk 13 will be moved so that it starts to register with the cold water inlet 12$^b$. The line marked B is so positioned that when the pointer 26$^a$ points toward the same the lug 42 is moved to such a distance from the lug 41 that increase in temperature of the thermostat 24 from room or normal temperature to the maximum temperature of the hot water entering through the passage 11, is sufficient to just move the lug 42 around into engagement with the lug 41 without appreciably moving the plate 31, and hence without moving the valve disk 13, the latter remaining always in registry with hot water alone. The maximum temperature of the hot water is assumed in this case to be 150° and the line B is correspondingly marked.

If the pointer 26$^a$ is adjusted to any position between the two lines A and B, increase in temperature of the thermostat 24 from room temperature toward the maximum hot water temperature will rotate the disk 29 in counter-clockwise direction, so as to move the valve disk 13 toward registry with the cold water inlet 12. The nearer the pointer 26$^a$ is adjusted to the line A, the sooner will the disk 13 come into registry with the cold water inlet 12, as the temperature of the thermostat 24 rises. As soon as cold water commences to enter the mixing chamber 23 in conjunction with the hot water, the temperature of the thermostat 24 ceases to rise, its expansion ceases, and the disk 29, together with the valve disk 12, is held stationary, as long as the temperature of the mixture of water entering the chamber 23 remains constant. Decrease in temperature of the mixture will cause contraction of the thermostat 24 and movement of the disk 29 in a counter-clockwise direction, the disk 13 following such movement, due to the spring 19, and moving toward hot water. An increase of the temperature within the chamber 23 will cause expansion of the thermostat 24, and counter-clockwise movement of the disk 29 with resultant movement through the lugs 41 and 42 of the disk 13 toward cold water. Thus, the valve disk 13 having been rotated away from its extreme hot water position by expansion of the thermostat, due to hot water entering through the passage 11, the apparatus will reach a state of equilibrium as soon as the valve disk 13 comes into sufficient registry with the cold water inlet 12 to arrest the increase of temperature in the chamber 23, and thus arrest the expansion of the thermostat 24. The temperature at which such registry with the cold water inlet occurs depends upon the initial positioning of the lug 42 with respect to the lug 41 by means of the handle 26. The greater the distance of the lug 42 from the lug 41 at the start, the greater will be the temperature of the thermostat and hence the water temperature at which equilibrium is reached.

As has been pointed out above, whenever the lug 42 is out of engagement with the lug 41, the passage 33 through the plate 31 registers with the slot 34 in the valve disk 29, so that at all such relative positions of the disk 29 and the plate 33, the water entering the chamber 23 is discharged to the waste pipe 37. As soon as the lug 42 strikes the lug 41 the opening 33 registers with the passage 38 in the valve disk 29, and the water from the chamber 23 is discharged through the faucet 40 for use. Also, as has been explained above, when the pointer 26$^a$ is manually adjusted to any position between the two lines A and B, the rising temperature of the thermostat 24 will cause the lug 42 to move into engagement with the lug 41, and the temperature of the thermostat 24 at which such engagement occurs depends upon the distance from the line A at which the pointer 26$^a$ is initially set. During the period of increasing temperature of the thermostat 24 from its initial temperature to the temperature at which the lugs 41 and 42 engage, the water entering the chamber 23 is discharged down the waste pipe. As soon as the lugs 41 and 42 engage, the water from the chamber 23 is discharged through the faucet 40. A slight further increase in the temperature of the thermostat 24 moves the valve disk 13 into partial registry with cold water, and as described a state of equilibrium is reached, the water continuing to discharge from the faucet 40. Thus, all the water entering the chamber 23 below a predetermined temperature, which temperature is determined by the initial setting of the pointer 26$^a$, is discharged or by-passed to waste, and as soon as the predetermined temperature is reached, the water starts discharging through the faucet 40 and continues to so discharge.

The path of travel of the pointer 26$^a$ between the two lines A and B may be graduated to indicate the temperature of water which will be discharged at the faucet 40 corresponding to the respective settings of the pointer, the graduations being determined by the expansive properties of the thermostat coil 24. For example, if it is desired to draw a volume of water at a temperature of substantially 90°, the handle 26 will be swung so that the pointer 26$^a$ indicates the line marked 90°. By such adjustment of the pointer, it will be understood, the lug 42 is moved away from the lug 41 a distance corresponding to the distance from the line A to the line marked 90°. The hot and cold water are now turned on by opening the valves 11$^a$ and 12$^a$. The position of the valve disk 13 is that shown in the drawing, namely in its extreme hot water position, being held in such position by the spring 19. The thermostat 24 is at substantially room temperature and hot water entering from the hot water inlet 11 and striking the thermostat 24 causes expansion thereof. The first water entering the chamber 23 is discharged down the waste pipe and such discharge continues until the thermostat 24 has been expanded to a sufficient extent to move the lug 42 into engagement with the lug 41, whereupon the discharge through the faucet 40 is started. When the temperature of the thermostat 24 has been raised to 90°, which will be shortly after the engagement of the lugs 42 and 41, the valve disk 13 starts to register partly with the cold water inlet 12, and the entering cold water mixing with the hot water in the chamber 23 arrests the rise of temperature in the chamber 23 and arrests the expansion of the thermostat 24. Thus, at a temperature of substantially 90° the water is started discharging through the faucet 40, and will continue discharge at a constant temperature of substantially 90° until the supply of water is cut off at the valves 11ª and 12ª.

Thus, there are accomplished advantages of distinct practical importance. The apparatus may be set for discharge of water of a given temperature from the faucet 40 and until a mixture of water of substantially that temperature is obtainable, the water is diverted or by-passed down the waste pipe, that is, water of substantially all temperatures other than the predetermined desired temperature are diverted from the faucet 40 and discharged to waste. It is well known that the water from a hot water supply pipe often runs cold or only partly warm for a period of time before coming up to normal hot water temperature. By means of the apparatus herein described, this water is by-passed to waste, and discharge through the faucet occurs only when the desired predetermined temperature of water is available.

In explanation of the above, assume that the pointer 26ª is again adjusted at 90°. Now, if the water entering the hot water inlet 11 is cold, for example below the initial temperature of the thermostat 24, the thermostat will first start to contract, moving the lug 42 further away from the lug 41. When the cold water in the hot water supply line between the source of supply and the inlet passage 11 has been discharged into the chamber 23, and through the waste pipe 37, the temperature of the water entering the chamber 23 will increase and the thermostat 24 will start to expand, moving the lug 42 toward the lug 41. If the increase in the temperature of the entering hot water is gradual, the increase in temperature of the thermostat 24 will also be gradual, together with the movement of the lug 42 toward the lug 41. All water entering the chamber 23 at a temperature below 90° will discharge to the waste pipe 37. If the temperature of the water entering through the hot water inlet 11 does not reach 90° there will be no discharge through the faucet 40. As soon, however, as the temperature within the chamber 23 reaches substantially 90°, the discharge through the faucet will commence and will continue at a temperature of 90°. The same action will take place for any other temperature setting of the pointer 26ª between the two lines A and B.

The two lines C and D mark the range of movement of the pointer 26ª throughout which the valve disk 13 may be moved and be entirely in registry with the cold water inlet 12ᵇ. If cold water is desired at the faucet 40, the pointer 26ª is adjusted substantially midway between the two lines C and B, whereby the intake recess 15 of the valve disk 13 is positioned substantially midway along the cold water inlet 12ᵇ. If the water which now enters through the cold water inlet 12 is at the start warmer than room temperature or the initial temperature of the thermostat 24, the thermostat will expand slightly, moving the valve disk 13 further in a counter-clockwise direction or further toward the extreme cold water position of the intake recess 15 of the valve disk 13. The length of the inlet passage 12ᵇ permits this movement, keeping the valve disk 13 always registering with the cold water inlet. If the water entering through the cold water inlet 12 is colder than room temperature or the initial temperature of the thermostat 24, the thermostat will contract, moving the valve disk 13 in clockwise direction toward hot water. The length of the inlet passage 12ᵇ permits this movement of the valve disk 13, and the constant maintenance of the intake recess 15 thereof in registry with the inlet passage 12ᵇ. Thus, when the handle 26 is adjusted substantially midway between the two lines C and D cold water alone will be admitted to the chamber 23 and discharged through the faucet 40. The temperature of the supply of cold water does not ordinarily vary to such extent as does the supply of hot water, and the amount of water flowing from the faucet 40 other than the coldest water obtainable from the cold water inlet is not appreciable.

If the hottest water obtainable is desired, the pointer 26ª is adjusted to point to the line B, in which position, as has been described, the lug 42 is at such a distance from the lug 41 that increase in temperature of the thermostat from room temperature to the maximum hot water temperature is adapted to just move the lug 42 into engagement with the lug 41 to bring the opening 33 into registry with the passage 38, and without affecting the position of the valve disk 13. If the temperature of the hot water then entering is higher than that normally obtainable, the lug 42 may move so far as to move the valve disk 13 a short distance in a counter-clockwise direction. The length of the intake passage 11ᵇ permits such movement and at the same time the continual registry of the intake recess 15 therewith so that no cold water is admitted, and only the hottest obtainable is discharged from the faucet 40.

The apparatus is so constructed that the water pressure therein is evenly distributed so as to avoid binding of the relatively movable parts and permit freedom of movement of the parts actuated by the expansion and contraction of the thermostat, as the water flows therethrough. The chamber 23 is closed on one side by the rotatable valve disk 13, and on the other side by the rotatable plate 31, and these two members are rigidly connected to rotate together so that the axial water pressure in the chamber 23 has no effect. Little or no water pressure is exerted against the valve disk 29, since the opening 33 in the plate 31 is always in registry with either the passage 34 or the passage 38. The valve disk 13 and the plate 31 may be made to closely fit the interior of the casing 10, and yet be permitted entire freedom of rotation. The leakage past the plate 31 is only a small amount, and will simply drip from the faucet 40. The parts of the apparatus are readily accessible by removal of the cover plates 10ᵇ and 17, and removal of the handle 26 from the spindle 25. By removal of the cover plate 10ᵇ and the handle 26, the entire inner mechanism may be removed as a unit from the rear of the casing.

From the above, it will be seen that there is herein provided apparatus which embodies the features of this invention and attains the objects thereof including many advantages of the greatest practical importance.

As many possible embodiments may be made of the mechanical features of the above invention, all without departing from the scope of the invention, it is to be understood that all matter herein set forth or shown in the accompanying drawings is to be interpreted as illustrative and not in a limiting sense.

I claim as my invention:

1. In apparatus of the class described, in combination, a mixing chamber, a plurality of inlet passages thereto for the admission of fluids having different temperatures, an outlet passage from said chamber, and means adapted to control said inlet passages to effect the admission to said chamber of a mixture of said fluids at substantially a predetermined temperature and adapted to control said outlet passage to open the same when substantially said predetermined temperature prevails in said chamber.

2. In apparatus of the class described, in combination, a mixing chamber, a plurality of inlet passages thereto for the admission of fluids having different temperatures, an outlet passage from said chamber, means adapted to control said inlet passages to effect the admission to said chamber of a mixture of said fluids at substantially a predetermined temperature and adapted to control said outlet passage to open the same when substantially said predetermined temperature prevails in said chamber, and means for adjusting said last means to vary said predetermined temperature.

3. In apparatus of the class described, in combination, a mixing chamber, a plurality of inlet passages thereto for the admission of fluids having different temperatures, two discharge passages from said chamber, and means adapted to control said inlet passages to effect the admission to said chamber of a mixture of said fluids at substantially a predetermined temperature and adapted to control said discharge passages to open one thereof when substantially said predetermined temperature prevails in said chamber and to open the other thereof at substantially all other temperatures in said chamber.

4. In apparatus of the class described, in combination, a mixing chamber, a plurality of inlet passages thereto for the admission of fluids having different temperatures, two discharge passages from said chamber, means adapted to control said inlet passages to effect the admission to said chamber of a mixture of said fluids at substantially a predetermined temperature and adapted to control said discharge passages to open one thereof when substantially said predetermined temperature prevails in said chamber and to open the other thereof at substantially all other temperatures in said chamber, and means for adjusting said last means to vary said predetermined temperature.

5. In apparatus of the class described, in combination, a mixing chamber, a plurality of inlet passages thereto for the admission of fluids at different temperatures, a discharge passage from said chamber, means controlling said discharge passage adapted to open the same when the fluid in said chamber is of substantially a predetermined temperature, and separate means for removing from said chamber fluid of other temperatures.

6. In apparatus of the class described, in combination, a faucet opening, a source of hot water, a source of cold water, means forming a common passage for water from said two sources to said faucet, and means controlling the flow through said passage adapted to admit to said faucet opening from said sources only water which is of substantially a predetermined temperature.

7. In apparatus of the class described, in combination, a faucet opening, a source of hot water, a source of cold water, means forming a common passage for water from said two sources to said faucet, a waste pipe, and means controlling the flow through said passage adapted to admit to said faucet opening from said sources water at substantially a predetermined temperature and adapted to discharge to said waste pipe incoming water of other temperatures.

8. In apparatus of the class described, in combination, a faucet opening, a source of hot water, a source of cold water, means forming a common passage for water from said two sources to said faucet, a waste pipe, and means adapted to divert from said faucet and to said waste pipe water at other than a predetermined temperature.

9. In apparatus of the class described, in combination, a faucet opening, a source of hot water, a source of cold water, means forming a common passage for water from said two sources to said faucet, a waste pipe, means controlling said passage adapted to admit therethrough water of a predetermined temperature from said sources, and means adapted to divert from said faucet and to said waste pipe water prior to the attainment of said predetermined temperature therein.

10. In apparatus of the class described, in combination, a mixing chamber, a hot water inlet thereto, a cold water inlet thereto, a faucet opening therefrom, a temperature controlled valve mechanism controlling said inlets and adapted to admit to said chamber a mixture of water of a predetermined temperature, and means adapted to divert from said faucet opening water flowing into said chamber until said mixture of predetermined temperature is obtained.

11. In apparatus of the class described, in combination, a mixing chamber, a hot water inlet thereto, a cold water inlet thereto, a valve mechanism adapted to control said inlets, temperature responsive means adapted to adjust said valve mechanism to admit to said chamber a mixture of a predetermined temperature, a faucet opening from said chamber, and means adapted to divert from said faucet water flowing into said chamber prior to the admission of said mixture of pretermined temperature.

12. In apparatus of the class described, in combination, a mixing chamber, a hot water inlet thereto, a cold water inlet thereto, a valve mechanism adapted to control said inlets, temperature responsive means adapted to adjust said valve mechanism to admit to said chamber a mixture of a predetermined temperature, a faucet opening from said chamber, means adapted to divert from said faucet water prior to the admission of said mixture of predetermined temperature, and means for adjusting said temperature responsive means to vary said predetermined temperature.

13. In apparatus of the class described, in combination, a mixing chamber, a hot water inlet thereto, a cold water inlet thereto, a valve mechanism adapted to control said inlets, temperature responsive means adapted to adjust said valve mechanism to admit to said chamber a mixture of a predetermined temperature, a faucet opening from said chamber, a bypass opening from said chamber, a valve mechanism controlling said last two openings, and means controlling said last valve mechanism adapted to maintain said bypass open and said faucet closed, until said adjustment is attained and adapted thereafter to close said bypass and open said faucet.

14. In apparatus of the class described, in combination, a mixing chamber, a hot water inlet thereto, a cold water inlet thereto, a valve mechanism adapted to control said inlets, temperature responsive means adapted to adjust said valve mechanism to admit to said chamber a mixture of a predetermined temperature, a faucet opening from said chamber, a bypass opening from said chamber, a valve mechanism controlling said last two openings, and means responsive to said temperature responsive means controlling said valve mechanism adapted to maintain said bypass open and said faucet closed until said adjustment is attained and adapted thereafter to close said bypass and open said faucet.

15. In apparatus of the class described, in combination, a mixing chamber, a hot water inlet thereto, a cold water inlet thereto, a valve mechanism adapted to control said inlets, temperature responsive means adapted to adjust said valve mechanism to admit to said chamber a mixture of a predetermined temperature, a faucet opening from said chamber, a bypass opening from said chamber, a valve mechanism controlling said last two openings, means responsive to said temperature responsive means controlling said valve mechanism adapted to maintain said bypass open and said faucet closed until said adjustment is attained and adapted thereafter to close said bypass and open said faucet, and means for adjusting said temperature responsive means.

16. In apparatus of the class described, in combination, a source of hot water supply, a source of cold water supply, means adapted to discharge water from said sources of supply for use, a connection to waste independent of the using means, and thermostatically controlled means adapted automatically to discharge water through said connection until sufficient hot water is supplied and thereafter divert the water from said connection and into said first line of discharge.

17. In apparatus of the class described, in combination, a source of hot water supply, a source of cold water supply, a mixing chamber, thermostatically controlled means adapted to discharge water for use from said mixing chamber at a predetermined temperature, a connection to waste independently of said discharge, and thermostatically controlled means adapted automatically to discharge water through said connection until sufficiently hot water is supplied and thereafter divert the water from said connection to said first discharge.

In testimony whereof, I have signed my name to this specification this 30th day of June, 1927.

ROBERT S. BLAIR.